United States Patent [19]
Sletten et al.

[11] 3,787,850
[45] Jan. 22, 1974

[54] AIRBORNE ANALOG MOVING TARGET DETECTOR

[75] Inventors: Carlyle J. Sletten, Acton; William B. Goggins, Jr., Winchester, both of Mass.

[73] Assignee: The United States of America as represented by the Secretary of the Air Force, Washington, D.C.

[22] Filed: Nov. 7, 1972

[21] Appl. No.: 304,583

[52] U.S. Cl. ................. 343/7.7, 343/9, 343/100 SA
[51] Int. Cl. ............................................. G01s 9/42
[58] Field of Search ............... 343/7.7, 8, 9, 100 SA

[56] References Cited
UNITED STATES PATENTS
3,176,297  3/1965  Forsberg .................... 343/100 SA
3,487,408  12/1969  Clarke ...................... 343/100 SA X
3,680,100  7/1972  Woerrlein ................... 343/100 SA X
3,735,400  5/1973  Sletten et al. ................. 343/7.7

*Primary Examiner*—T. H. Tubbesing
*Attorney, Agent, or Firm*—Harry A. Herbert, Jr. et al.

[57] ABSTRACT

An analog moving target detector in which the transmitter feeds inputs to a Butler matrix connecting a series of antennas. On reception the received signals are fed to a plurality of series of scaling circuits, each series corresponding to one antenna. Corresponding circuits of each series are then summed, fed to intermediate frequency mixers, followed by box car circuits. The output of the box car circuits are fed to selected doppler filters and then to indicators to detect the range, angular position, and range rate.

2 Claims, 6 Drawing Figures

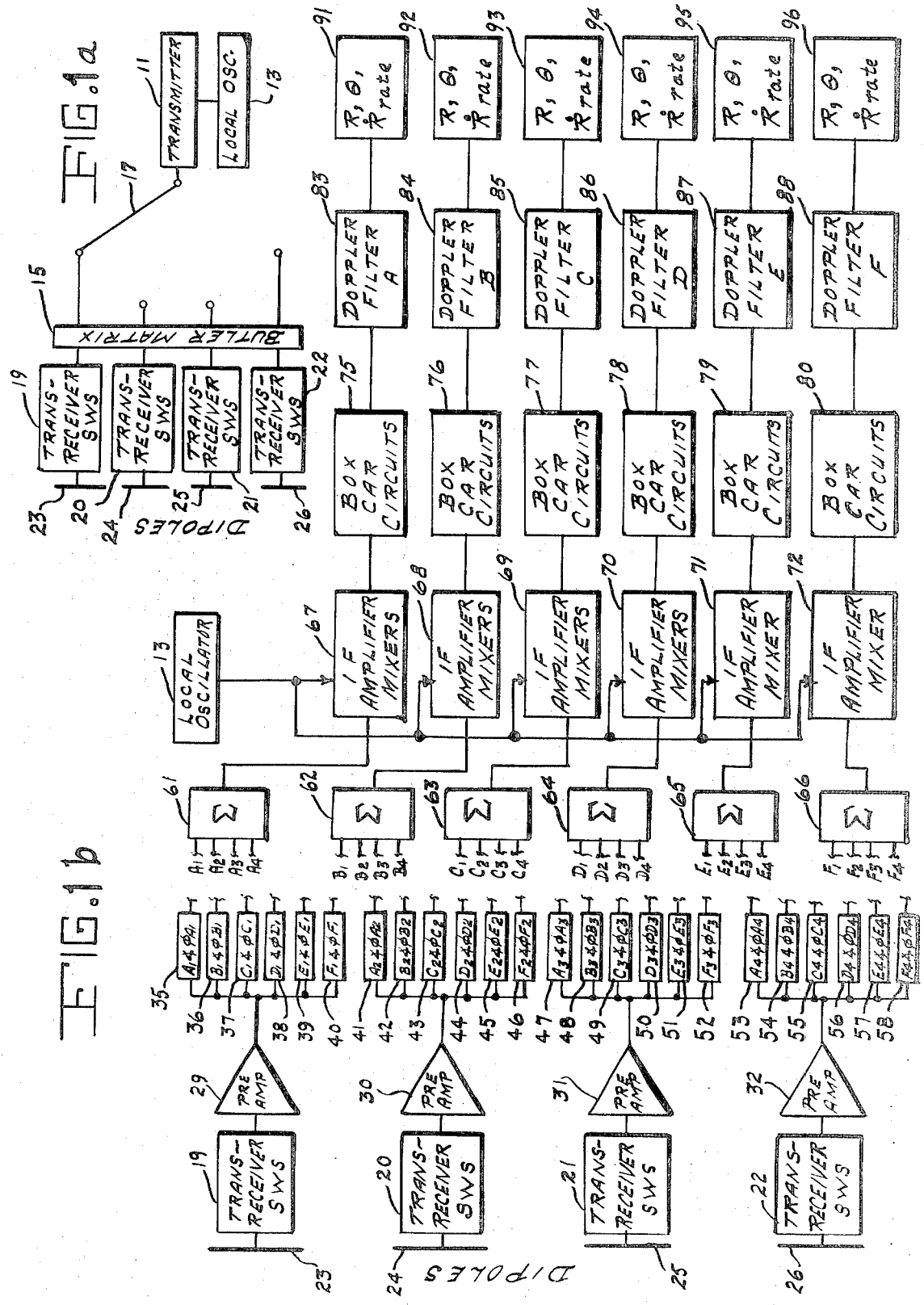

AIRBORNE ANALOG MOVING TARGET DETECTOR

BACKGROUND OF THE INVENTION

This invention relates to analog moving target detectors, and more particularly to a detection system using multiple pattern antenna null formation with matching doppler filters.

For airborne early warning against low flying enemy aircraft and submarine launched missiles, elevated airborne radars are needed to obtain sufficient range and prevent the curved earth from obscuring low flying threats. Present airborne early warning radars suffer from ground clutter that produce false targets and require costly radomes and aerodynamics.

This invention provides an improved method for detection and location of aircraft from an airborne search radar which greatly reduces the masking effect of ground clutter on moving target detection. The antenna system can be flush mounted on the air-frame, thus eliminating the large radomes. Effects of aircraft structure on antenna sidelobes can be compensated for and improved range and signal to noise ratios achieved by moving range gates following the doppler filters.

SUMMARY OF THE INVENTION

The present invention presents a novel antenna and doppler filtering system useful for airborne search radars or sonars. A system of sequentially switched or simultaneously multibeam antenna patterns is generated for transmission and another set of receiving patterns obtained with deep nulls in the azimuth angular intervals corresponding to ground clutter which would normally enter the bandpass doppler filter of the receiving channel. A bank of bandpass doppler filters covering radial velocity doppler frequencies of all targets of interest are designed to have extremely high attenuation on the main beam clutter of the received antenna pattern to which it is connected. An analog system is described for processing many targets in large volumes of radar search. Signal to clutter improvement is obtained by optimizing antenna gain and null shaping and by moving range gates behind doppler filters.

It is an object of the invention to provide an improved analog method and system for detecting and locating aircraft from airborne radar.

It is another object to provide an improved airborne analog moving target radar which greatly reduces the effect of ground clutter.

These and other objects, advantages and features of the invention will become more apparent from the following description taken in connection with the illustrative embodiment in the accompanying drawings.

DESCRIPTION OF THE DRAWINGS

FIGS. 1a and 1b are block diagrams of an embodiment of the invention;

DETAILED DESCRIPTION OF THE PREFERRED EMBODIMENT

Figure 2A:
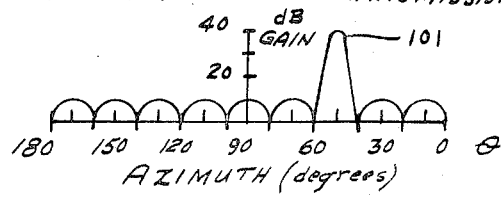
FIGS. 2a, 2b and 2c are graphs showing analog patterns.

FIG. 1a shows the system of the anticlutter radar system which is illustrated using a four-element array for simplicity, although any number of elements can be used. Radar pulses are generated from coherent transmitter 11 as controlled by local oscillator 13 and these pulses are fed to the four elements of Butler matrix 15 through electronic switch 17. The Butler matrix is described in ELECTRONIC DESIGN, Vol. 9, pp 170–173, Apr. 12, 1961, in *Beam-Forming Matrix Simplifies Design of Electronically Scanned Antennas*, by J. Butler and R. Lowe. The output of Butler matrix 15 is fed through transmitter-receiver switches 19–22 to radiating elements 23–26 which can have various forms such as slots or dipoles.

FIG. 1b shows the reception system of the anticlutter radar system. After the radiating pulses are received by the same elements 23–26, the signals are fed via transmitter-receiver switches 19–22 to preamplifiers 29–32.

The antenna can consist of an array of elements, for example, slots or dipoles, mounted on the fuselage or wing of search aircraft. On transmission all pulse power is fed to one beam (or alternatively to many simultaneous beams) of a Butler array as mentioned. Several such overlapping beams are available with this type of array covering, for example, ± 45° of azimuth with a beam width of 4°. On reception each radiating element is disconnected from Butler matrix 15 and multiple patterns each with the main beam coincident with the transmit beam but with deep doppler notches obtained by a technique known as the Drane-McIlvenna method are directed toward the doppler clutter spectrum angles where sidelobe clutter frequency would be accepted by sharply tuned doppler filters. The Drane-McIlvenna technique is discussed in, *Null Steering and Maximum Gain in Electronically Scanned Dipole Arrays*, by C. J. Drane, Jr. and J. F. McIlvenna, in AFCRL 72–0083, 1 Feb. 1972, and is implemented by circuits 35–58 which are phase shifting and amplifying networks. Fixed or slow moving targets with a doppler spectrum within the clutter spectrum of the main beam are not detected. Sector scanning can be done sequentially or simultaneously switching to available Butler beams. Beam comparison on targets with the same range and dopplers could be made to improve azimuth accuracy. When radar is used for long range search the doppler variation with elevation look angles is minimal.

A deep antenna null is placed at the angle at which the ground clutter returns have the same doppler frequency as that of the doppler filter peak. This is accomplished by properly determining the receiving antenna element feeding coefficients. In FIG. 1 these are $A_1 < \phi A_1$ through $A_4 < \phi A_4$ for doppler filter A, $B_1 < \phi B_1$ through $B_4 < \phi B_4$ for dopper filter B, etc. The letters correspond to a particular channel. The first letter represents the amplitude, the second letter represents the phase angle while the subscript numeral corresponds to the antenna elements. The outputs of all the circuits having the same letter designation are summed in summers 61–66. The outputs of the scaled signals have the appropriate notches and are fed to IF mixers 67–72 where they are mixed with the signals from local oscillator 13. The IF pulses are then fed to box car circuits 75–80, the output thereof being the envelope of the pulses and this envelope is the doppler frequency which is fed to respective doppler filters 83–88. The outputs of the doppler filters are fed to appropriate indicators 91–96 to obtain the range R, the azimuth $\theta$, and the range rate $\dot{R}$ of the target with the clutter removed.

Figure 2B:
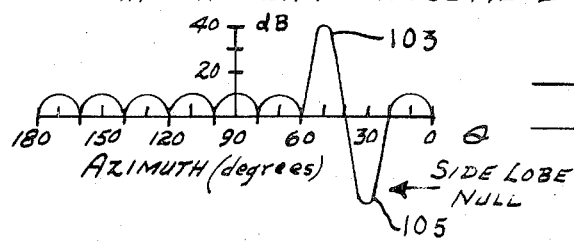
Figure 2C:
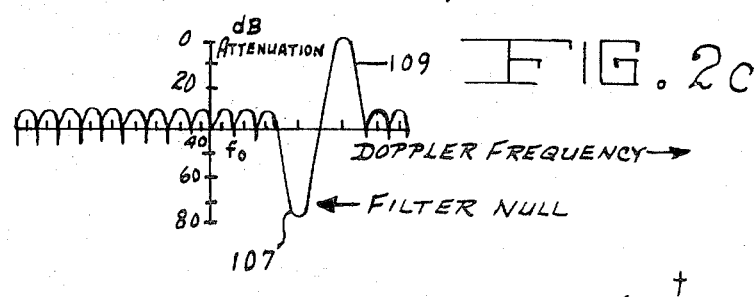

FIGS. 2a, 2b and 2c show the relationship between doppler frequency response and antenna patterns on reception and transmission. FIG. 2a is an example of transmission patterns showing main lobe 101 with numerous side lobes. FIG. 2b is an example of an antenna pattern upon reception showing main lobe 103 and side lobe null 105. FIG. 2c shows the doppler frequency response of a single doppler filter where the horizontal coordinate represents the doppler frequency. Curve 107 is the filter null and curve 109 is the filter peak response.

Figure 3:
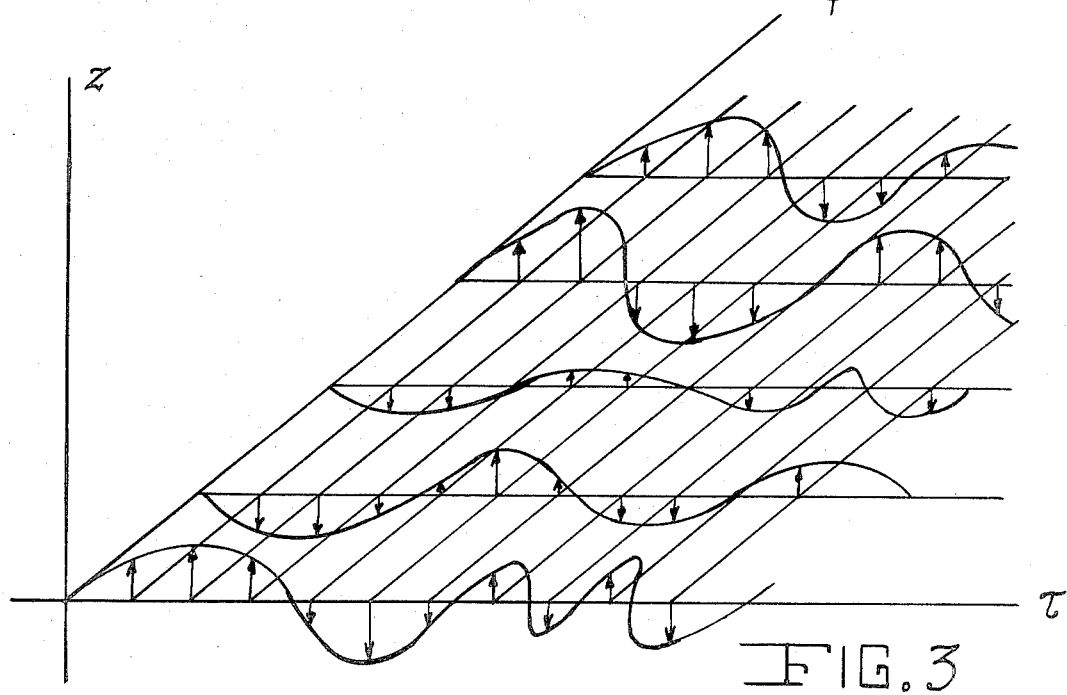
FIG. 3 shows a graph of the waveform that receives radar waves.

FIG. 3 shows the inputs to the box car circuits. Each $\tau$ measured along the t axis represents one input to the box car circuits. The amplitudes are measured in the Z axis which represents complex numbers.

The doppler filters are designed to place filter nulls at the doppler frequencies which correspond to the clutter spectrum of the antenna main beam thus further reducing clutter signals. Additional doppler filters outside the clutter spectrum corresponding to the speed of the search radar platform can be added to any receive pattern to receive signals from very fast moving targets. Only one set of doppler filters are needed for all beams. However, the Drane-McIlvenna feeding coefficients for each doppler filter multiplied by the number of beams are required. If a band rejection filter is used to attenuate main beam clutter this filter would change (clutter spectrum changes with main beam look direction) as search beam (or beams) are switched. Such a band-stop filter can be cascaded in series circuit with all the parallel and unchanged doppler band pass filters.

To achieve the very low side lobes and shape of side lobe notches antenna patterns could be trimmed on the aircraft against ground clutter.

To realize the moving range gate concept for very high speed, long time target tracking many banks of doppler filters are needed and the range bins moved with the radial velocities appropriate to the doppler filter that follows the range gate.

Generating deep nulls in the transmit pattern could be considered also, but this is not feasible because each doppler filter channel requires a different pattern. The best transmit patterns would have generally low side lobes.

The same mathematical theory (McIlvenna and Drane) of deep null formations can be used with the doppler filters to suppress main lobe clutter on each band pass filter. Such filters can be self-adapting to provide optimum (or favorable) attenuation as doppler frequency functions against clutter signals. For example, when doppler frequencies outside the band pass of a receiver-antenna channel appear in the output of the channel the band rejection can be increased at these doppler frequencies by varying the filter parameters. It should be noted that self-adapting on the antenna array (feeding coefficients) parameters may not be successful because the antenna array is not a "closed" system since radome and airframe reflections are not included in the relationship between feeding coefficient and antenna pattern characteristics. The time domain filter is a "closed" system in this sense, and thus can be made self-adapting against clutter signals.

What is claimed is:

1. An analog airborne moving target detection system comprising:
  a. a coherent radar transmitter;
  b. a plurality of radiating elements;
  c. means for connecting the plurality of radiating elements to the radar transmitter in a preselected pattern;
  d. a plurality of series of receiver scaling circuits, each of the series being fed by one each of the radiating elements;
  e. a plurality of summers fed by the corresponding scaling circuits of each of the series;
  f. a plurality of box car circuits fed by one each of the plurality of summers;
  g. a plurality of doppler filters each having a different frequency response and fed by one each of the plurality of box car circuits; and
  h. a plurality of indicating means fed by one each of the plurality of doppler filters.

2. An airborne moving target detection system according to claim 1 wherein the connecting means comprises:
  a. a Butler matrix having a plurality of inputs and a plurality of outputs being fed to one each of the plurality of radiating elements; and
  b. means for selectively switching the transmitter to the plurality of inputs of the Butler matrix.

* * * * *